UNITED STATES PATENT OFFICE.

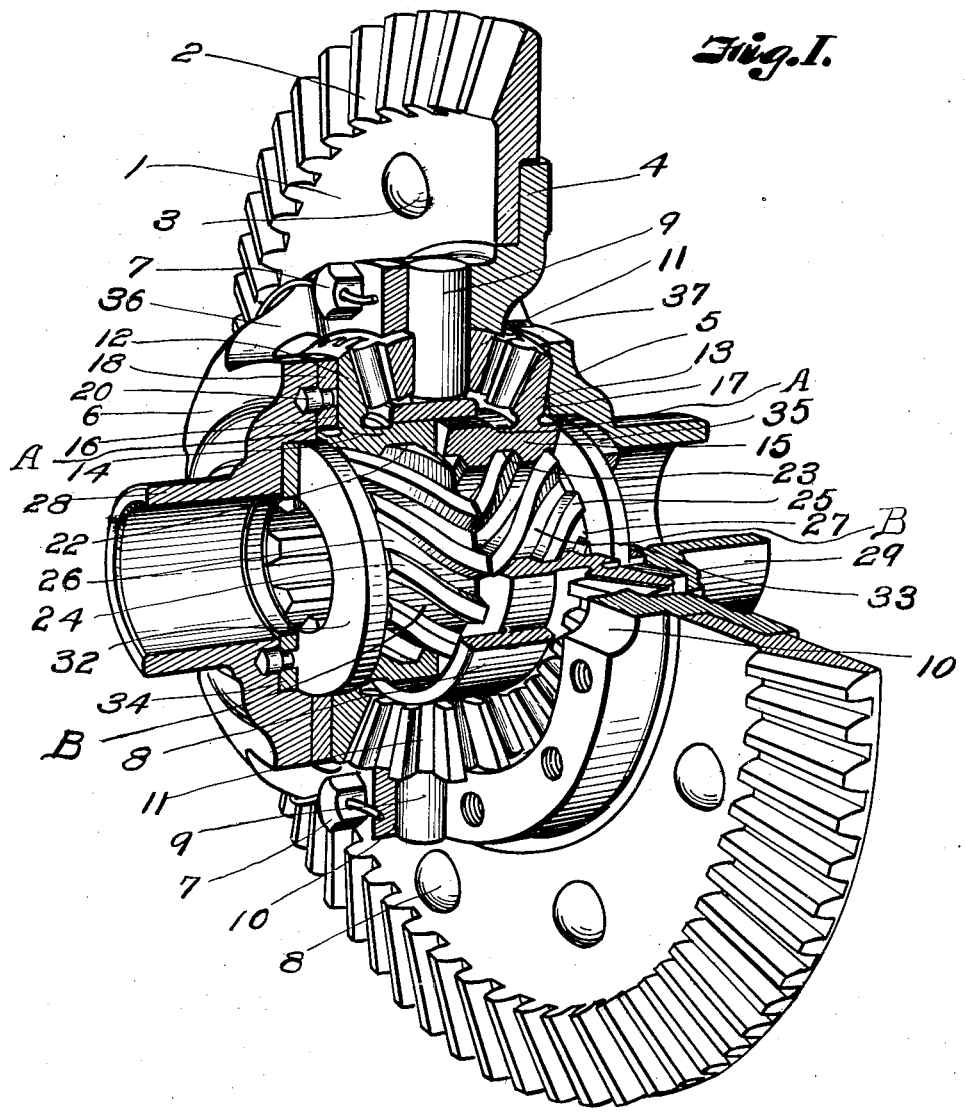

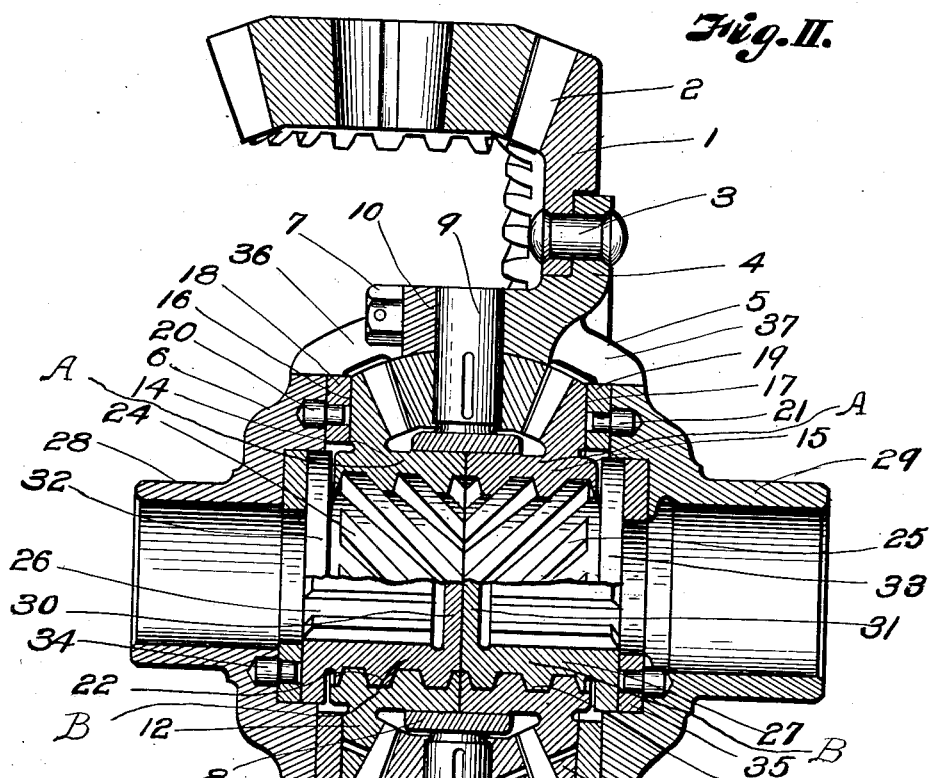
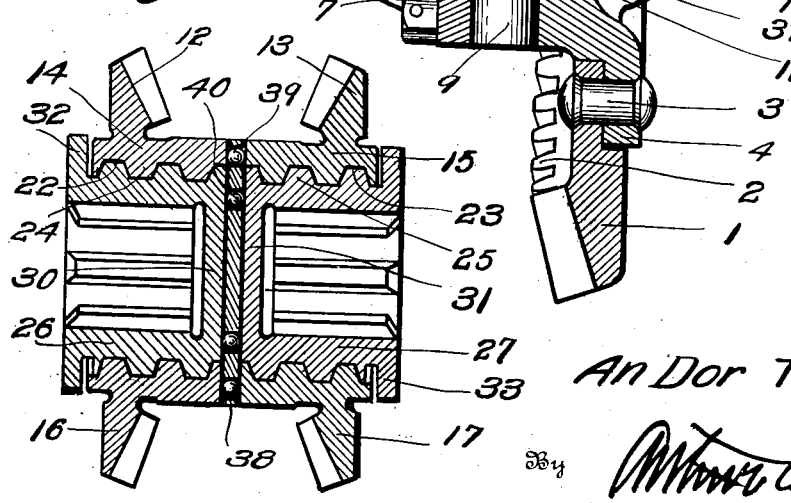

ANDOR T. NOGRADY, OF WICHITA, KANSAS, ASSIGNOR TO THE NOGRADY DIFFERENTIAL COMPANY, OF WICHITA, KANSAS, A CORPORATION OF WEST VIRGINIA.

DIFFERENTIAL GEARING.

1,361,895.           Specification of Letters Patent.     Patented Dec. 14, 1920.

Application filed April 4, 1919. Serial No. 287,604.

*To all whom it may concern:*

Be it known that I, ANDOR T. NOGRADY, a citizen of the United States, residing at Wichita, in the county of Sedgwick and State of Kansas, have invented certain new and useful Improvements in Differential Gearing; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to locking differential gearing and particularly to a mechanism utilized for driving alining separated parts or sections of a driven axle of a motor vehicle whereby the driving power may be applied through the axle members to the ground wheels and whereby variation in speed of the respective driven wheels of the vehicle is permitted when deviating from a straight course, the construction being such that when either wheel loses traction, a thrust within the gearing effects an engagement with the axle members so that they are driven as a unit. In the event, however, that one wheel is relatively retarded and the other is relatively advanced, as is in the case when differentiating, the engagement of the gears is released so that a free acting differential movement is permitted.

One of the objects of the invention is to provide a differential gearing which generically conforms to the conventional embodiment of a differential gear but which includes means for engaging certain of the parts together in an efficient and convenient manner for the purpose specified.

The invention contemplates the provision of means for shifting the thrust of certain elements in line with the axle parts so that the axles may be engaged or permitted to differentiate, as the occasion may demand and the invention includes means for accomplishing the desired result without perceptibly shifting any of the elements within the gear housing.

In the drawings,

Figure I is a perspective view showing certain of the gear elements and part of the housing.

Fig. II is a vertical longitudinal sectional view through a differential gearing constructed in accordance with my invention, and Fig. III is a sectional view of an embodiment of my invention showing an antifriction bearing associated therewith.

Referring now to the drawings by numerals of reference:

1 designates a master wheel which constitutes the driving member, having teeth 2 adapted to mesh with a pinion on the drive shaft from the "transmission" in the usual manner. The driving member is connected to the housing by bolts or rivets 3 which pass through the ring 1 and through the flange 4 carried by the member 5 coöperating with the housing member 6 to inclose the gears, and the members 5 and 6 are preferably held together by screws 7, as will be well understood.

Within the housing is a differential pinion-supporting spider consisting of a ring 8 having a plurality of radially supported bearing pins 9 extending therefrom and projecting into the openings 10 of the housing, the openings 10 being formed by bringing the two housing members 5 and 6 together and securing them by the bolts 7 so that notches in the edges of the respective housing members will register. On the bearing pins 9 are beveled pinions 11 which mesh with gears 12 and 13 carried by and forming parts of one set of thrust members A—A including tubular portions 14 and 15. The gears 12 and 13 are at right angles to the tubular portions of the thrust members and have thrust faces 16 and 17 which are adapted to bear against the thrust bearings shown as rings 18 and 19 in opposite ends of the housing. The bearings 18 and 19 are simply wear rings and these may be omitted if desired, but in that event, there will be a corresponding wear surface at each side of the housing. The bearings 18 and 19 may be secured to the opposite sides of the housing by studs or pins 20 and 21 which are counter-sunk into the walls of the housing and may project through the openings in the ring, as best seen in Fig. II.

The tubular members 14 and 15 of the thrust members A—A have interengaging connection with a second set of thrust members B—B constituting actuators for the first set and controlled by the respective halves or sections of the usual split axle so that the actuators may cause a thrust to be imparted to the thrust members A—A when both axle sections are to be driven at the same speed as, for example, when the vehicle is traveling in a straight line.

In the illustration expressing the preferred embodiment of my invention I have shown the tubular portions 14 and 15 of the thrust members A—A as being interiorly ribbed as at 22 and 23 respectively, the ribs or threads serving as cams to engage the exterior ribs or cams 24 and 25 of the thrust member actuators B—B which are shown as comprising interiorly splined collars or sleeves 26 and 27 to engage the respective halves or sections of the axle in the usual manner, it being understood that the axle sections are adapted to pass into the sleeve members 28 and 29 on the housing members 5 and 6.

The inner ends of the tubular portions 26 and 27 of the thrust actuators B—B are closed as shown at 30 and 31 while the outer ends of the tubular portions 26 and 27 are provided with thrust flanges 32 and 33 to frictionally engage the wear rings 34 and 35 corresponding in structure and function to the rings 18 and 19 and these are arranged to become effective when the thrust is reversed due to the reversal of the gear 1. 36 and 37 are openings in the housing members 5 and 6 for the introduction of a lubricant, it being understood that the entire differential gearing will be housed in the usual protective casing which it is deemed unnecessary to illustrate here.

Attention is directed to the fact that the coöperating parts have relatively close clearances, for example, the ends of the members 14 and 15 and 26 and 27 are separated from their thrust rings by a thin film of oil and as the actuators B—B thrust in outward direction against the sides of the casing, a functional engagement will be effected between the outer faces of the gears 12 and 13 and the rings 18 and 19, (there being no perceptible movement, however), to cause the engagement of the gears 12 and 13 with the rings 18 and 19 rigidly supported by the housing. When, however, the gear 1 is reversed and the vehicle is moving in a relatively straight line, the flanges 32 and 33 will frictionally engage against the surfaces 34 and 35, the members 12 and 13 having been previously relieved from frictional engagement with the rings 18 and 19. It is also obvious that suitable lubricating ports may be provided for the respective gears but since the particular location of the ports is not a part of my invention, I have deemed it unnecessary to illustrate or describe to any great particularity the location of these ports.

When the parts are assembled as shown in Fig. II and the driving member 2 is rotated to drive the car forward, the exterior threads on the members 26 and 27 will cause a thrust of the thrust members A—A to be exerted against the thrust bearing rings 18 and 19 so that both axles will be frictionally connected together. When differentiating, however, the power transmitted from the ground wheels through the axle members counteracts the end thrust to release the engagement. When the axle having the greatest velocity is again picked up, however, the thrust on the thrust member with which it coöperates will again be in outward direction to frictionally engage its thrust face so that both axles will again be rotated in unison.

The operation just described takes place upon reversal of the gear 1, it being understood, of course, that the members B—B and rings 34 and 35 then become the active thrust elements.

The advantages of the invention will be apparent when it is considered that in all locking differential gearing, the construction is such that whenever one of the wheels loses traction, the axle of the remaining active wheel takes substantially all of the load, thereby greatly increasing the tooth pressure on the gearing. Since locking differential gearings are generally constructed of worm or spiral gears, the amount of space in the axle housing available prevents the embodiment of gears large enough to withstand the maximum tooth pressure adapted to be exerted upon the gears under the conditions above enumerated.

The present invention contemplates a construction wherein the excess tooth pressure will be compensated for by the fact that it is possible to introduce gears of larger pitch diameters in the space available within the axle housing than would be possible in the known types of differential gearings, in which the worm or spiral gears are employed.

In the claims I have referred to the thrusts as "engaging thrusts" and it is to be understood that the invention contemplates the utilization of thrust members in the novel manner claimed whether there is frictional engagement or positive engagement between the thrust members and the housing. The word "engage" is used in the sense of working upon or into another part, either in the sense of appearance or actual attachment so that under certain conditions thrust members may cause the housing or its equivalent to actually rotate with the thrust member or under other conditions to permit the housing to rotate independently thereof.

In Fig. III I have shown the same generic embodiment of my invention as illustrated in Figs. I and II but in this form, an anti-friction bearing ring 38 is introduced between the ends of the members 14 and 15 and between the members 26 and 27, there preferably being separate rows of balls 39 and 40 for the respective sets of thrust members although the particular construction of the bearing is not material.

What I claim and desire to secure by Letters-Patent is:

1. In a differential gearing, a driving member, driving gears carried by the driving member, a set of driven gear members driven by the driving gears, the driving member and driven gear members having clutch faces coöperating to cause the driving member and the driven gear members to normally clutch together due to thrusts imparted to the driven gear members by the driving gear members, so that the driving member and the driven gear members are normally rotated at the same speed, and axle members coöperating with the driven gear members to relieve the effective clutching thrusts between the driving member and the driven gear members when the gearing is differentiating.

2. In a differential gearing, a driving member, driving gears carried by the driving member, a set of driven gear members driven by the driving gears, the driving member and driven gear members having clutch faces coöperative to cause the driving member and the driven gear members to normally clutch together due to thrusts imparted to the driven gear members by the driving gear members, so that the driving member and the driven gear members are normally rotated at the same speed, and axle members coöperating with the driven gear members to normally augment effective clutching thrusts between the driving member and the driven gear members and to relieve the effective clutching thrusts between the driving member and the driven gear members when the gearing is differentiating.

3. In a differential gearing, a driving member, driving gears carried by the driving member, a set of driven gear members driven by the driving gears, the driving member and the driven gear members having clutch faces coöperative to cause the driving member and the driven gear members to normally clutch together due to thrusts imparted to the driven gear members by the driving gear members, so that the driving member and the driven gear members are normally rotated at the same speed, and axle members within the driven gear members and coöperating with the driven gear members to augment the effective clutching thrusts between the driving member and the driven gear members and to relieve the effective clutching thrusts between the driving member and the driven gear members when the gearing is differentiating.

4. In a differential gearing, a driving member, driving gears carried by the driving member, a set of driven gear members driven by the driving gears, the driving member and driven gear members having clutch faces coöperative to cause the driving member and the driven gear members to normally clutch together due to thrusts imparted to the driven gear members by the driving gear members, so that the driving member and the driven gear members are normally rotated at the same speed, and spirally splined axle members within the driven gear members, the splines of the axle members engaging complementary grooves in the driven gear members and movable to augment the clutching thrusts between the driving member and the driven gear members, the degree of thrust exerted by the axle members depending upon the pitch of the splines.

5. In a differential gearing, a driving member, driving gears carried by the driving member, a set of driven gear members driven by the driving gears, the driving member and driven gear members having clutch faces coöperative to cause the driving member and the driven gear members to normally clutch together due to thrusts imparted to the driven gear members by the driving gear members, so that the driving member and the driven gear members are normally rotated at the same speed, and spirally splined axle members within the driven gear members, the splines of the axle members engaging complementary grooves in the driven gear members and movable to augment the clutching thrusts between the driving member and the driven gear members, the degree of thrust exerted by the axle members depending upon the pitch of the splines, said axle members having reversing movement to relieve the effective clutching thrusts between the driving member and the driven gear members when the gearing is differentiating.

6. In a differential gearing, a driving member, driving gears carried by the driving member, a set of driven gear members driven by the driving gears, the driving member and driven gear members having clutch faces coöperative to cause the driving member and the driven gear member to normally clutch together due to thrusts imparted to the driven gear members by the driving gear members, so that the driving member and the driven gear members are normally rotated at the same speed, and axle members within each driven gear member having spline connection with the hubs of the driven gear members, the splines on one axle member being spiraled oppositely to those on the alining axle member.

7. In a differential gearing, a driving housing, driving gears carried by the driving housing, a set of driven gear members driven by the driving gear, the inner walls of the driving housing and the driven gear members comprising clutch faces, coöperative to cause the driving housing and the driven gear members to normally clutch together due to thrusts imparted to the driven gear members by the driving gear members, so that the driving housing and the driven gear members are normally rotated at the same speed, and axle-receiving members coöperating with the driven gear members to relieve the effective clutching thrusts between the inner walls of the housing and the driven gear members when the gearing is differentiating.

8. In a differential gearing, a driving member, including a rigidly connected housing, driven gear members within the housing and having thrust faces adjacent to an inner wall of the housing, and thrust controlling members mounted within the driven members and upon the axles to impart a longitudinal thrust to said driven members to cause the driven members to normally engage the walls of the housing and, when differentiating, to relieve said thrusts by the power transmitted from the ground wheels through the axles.

9. In a differential gearing, a driving member including a housing, driving gear members within the housing, driven gear members within the housing and meshing with the driving gear members, the driven gear members having housing-engaging faces, and axle-operated, thrust-controlling members, within the housing normally imparting thrusts to the driven members to cause said members to engage the housing to drive the axle members equally, said actuating members being also effective, when the gearing is differentiating, to relieve the effective thrusts of the gear members with respect to the housing.

10. In a differential gearing, a housing, a set of driven gear members within the housing, each having a housing-engaging clutch face, and a set of axle members, each coöperating with a driven gear member for alternately rendering the thrust of the housing-engaging faces on the gear members effective and ineffective.

11. In a differential gearing, a driving housing, a set of driven gear members within the housing, having housing-engaging faces, and axle members in coöperative relation with the driven gear members and normally functioning with the driven gear members to cause housing-engaging thrusts to be imparted to the driven gear members.

12. In a differential gearing, a driving housing, a set of driven gear members within the housing having housing-engaging faces, and axle members in coöperative relation to the driven gear members and normally functioning with the driven gear members to cause housing-engaging thrusts to be imparted to the driven gear members, the axle members also coöperating with the driven gear members when the gearing is differentiating to relieve the effective thrust of the gear members with respect to the housing.

13. In a differential gearing, a housing, a set of driven gear members within the housing having housing-engaging clutch faces, axle members within the housing having housing-engaging clutch faces, and means connecting the axle members with the gear members for alternately rendering the housing-engaging faces of the respective gear members and axle members effective and ineffective.

14. In a differential gearing, a driving member including a housing, driven gear members within the housing, having thrust faces adjacent to the inner wall of the housing, and axle-operated thrust controlling members within the housing operable on the driven members to cause said members to engage the housing, said actuating members being also effective, when the gearing is differentiating, to release the gear members with respect to the housing by power transmitted from the ground wheels through the axles.

15. In a differential gearing, a driving member including a housing, connecting gears mounted in the housing driven gear members actuated by the connecting gears, axle members actuated by the driven gear members, and coöperating thrust imparting means between the axle members and the driven gear members, so related that the application of power from the driving member normally imparts housing-engaging thrusts to the driven gear members, and, when differentiating, transmits power from the ground wheels through the axle members to relieve the effective thrust between the driven gear members and the housing.

16. In a differential gearing, a driving member including a housing, connecting gears mounted in the housing, driven gear members actuated by the connecting gears, axle members actuated by the driven gear members, thrust-imparting means integral with the axle members and engaging the driven gear members, and coöperating thrust imparting means between the axle members and the driven gear members, so related that the application of power from the driving member normally imparts housing-engaging thrusts to the driven gear members and, when differentiating, transmits power from the ground wheels through the axle members to relieve the effective thrust between the driven gear members and the housing.

17. In a differential gearing, a driving member including a housing, connecting gears mounted in the housing, driven gear members actuated by the connecting gears and having hub portions provided with interior, spiral grooves, and axle members within the hub portions having spiral splines engaging corresponding grooves in the hub portions of the driven gears to impart housing-engaging thrusts to the driven gears, the degree of thrust engagement being determined by the pitch of the splines.

18. In a differential gearing, a housing, a set of driven gear members within the housing, each having an integral housing-engaging clutch face, a set of axle members, each engaging a gear member and each having a housing-engaging face, and means connecting the axle members with the gear members for alternately rendering the housing-engaging faces on the gear members and the axle members effective dependent upon the rotation of the axle members.

In testimony whereof I affix my signature.

ANDOR T. NOGRADY.